Figure 1:
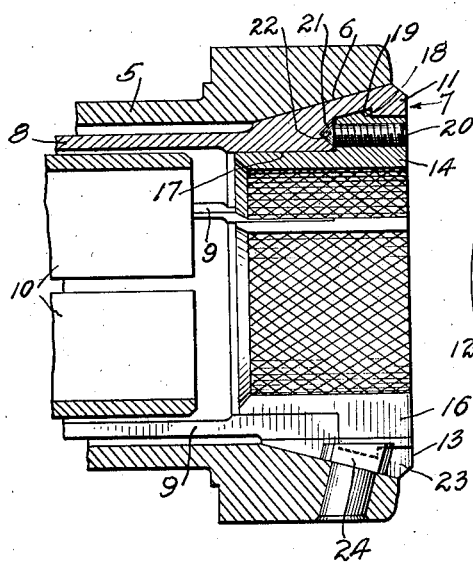

May 23, 1939.　　D. H. MONTGOMERY　　2,159,931

CHUCKING MEANS

Filed Nov. 10, 1937

INVENTOR
DONALD H. MONTGOMERY
BY
ATTORNEYS.

Patented May 23, 1939

2,159,931

UNITED STATES PATENT OFFICE 2,159,931

CHUCKING MEANS

Donald H. Montgomery, West Hartford, Conn., assignor to The New Britain Machine Company, New Britain, Conn., a corporation of Connecticut Application November 10, 1937, Serial No. 173,811

6 Claims. (Cl. 279—51)

My invention relates to a collet and more particularly to means for securing false jaws or pads in said collet.

Due to the difficulty of removing spring collets from their spindles or other holders for replacement by collets having different gripping diameters, and due to the expense of maintaining a plurality of sets of interchangeable collets of different sizes, it is now common practice to employ what may be termed a "master" collet, and leave the same in the machine permanently. False jaws or pads are removably secured to the master collet and sets of such false jaws, being relatively cheap, may be economically kept on hand and readily applied to the master collet, so as to provide for gripping any size stock desired.

It is the principal object of my invention to provide improved means for holding pads or false jaws in a collet, whereby looseness and wear are reduced to a minimum and the maximum degree of strength and rigidity secured.

Other objects and features of the invention will be hereinafter pointed out or will become apparent to those skilled in the art.

In the drawing which shows, for illustrative purposes only, a preferred form of the invention—

Figure 2:
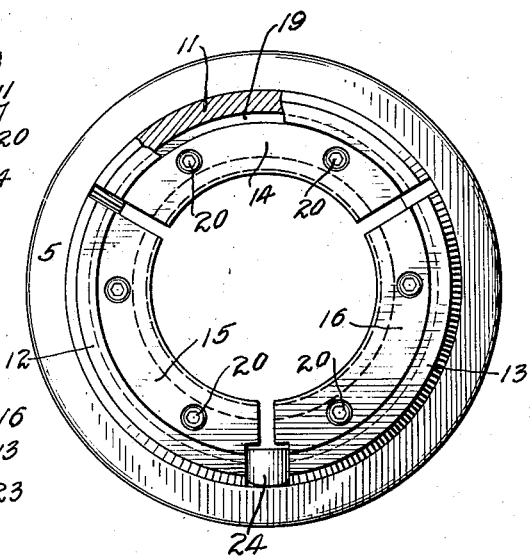

Fig. 1 is a fragmentary longitudinal sectional view of a spindle and collet illustrating features of the invention, the section being taken on a somewhat irregular plane; and Fig. 2 is a front view of the spindle and other parts shown in Fig. 1, a part of the collet being broken away for illustration.

In said drawing 5 indicates a collet holder, which may be a spindle in a metal working machine, such as a screw machine. The invention will be described as embodied in a collet of the draw-back type. The nose of the spindle is provided with a rearwardly tapering or bell-mouthed recess 6, for receiving the correspondingly tapered spring collet 7. The spring collet, as will be understood, includes a collet tube 8, split longitudinally at a number of places circumferentially, as indicated at 9—9, so as to provide for a springing out or opening of the collet when the latter is moved forwardly or to the right as viewed in Fig. 1, all as is now common practice.

10 indicates the forward end of a feed tube or pusher for bar stock, which, in a screw machine, periodically forces a length of stock forward against a stock stop and holds the same in that position until the collet is drawn rearwardly, so as to cause it to grip the stock.

In the embodiment herein illustrated the collet is provided with three jaws 11—12—13 and each jaw is provided with a false jaw or pad, designated, respectively, 14—15—16. The false jaws or pads at their adjacent edges are preferably spaced slightly from each other, but so slightly as to provide almost a continuous circumferential gripping surface, corresponding in general to the ordinary gripping surfaces of spring collets without false jaws. The pads have longitudinally extending surfaces 17, for accurately fitting the inside circumferential surfaces of the jaws 11—12—13 for resisting radial outward movement of the pads on the jaws. Each collet jaw when of the draw-back type is provided with a rearwardly facing, generally radially and circumferentially extending shoulder or abutment surface 18 adjacent the forward end. Each of the pads is provided with a forwardly facing, generally radially outwardly and circumferentially extending shoulder or abutment surface 19 for co-action with the surface 18.

Speaking generally, the abutment surface 18 on the jaw may be said to face in the direction toward the end of the jaw having the smaller diameter due to the longitudinally tapered outside surface and the abutment surface 19 on the pad may be said to face oppositely or in the direction toward the end of the jaw having the larger diameter.

The pads 14—15—16 are urged longitudinally outwardly, so as to cause the surfaces 18—19 to firmly engage each other. In the form shown I employ one or more headless screws 20 in each pad, and these screws extend rearwardly and into engagement with a suitable surface on the spring collet jaws, so as to urge the pads longitudinally forwardly and the surfaces 18—19 into constant and firm engagement with each other. Preferably the screws 20 are also arranged to urge the pads radially outwardly so as to cause the surfaces 17 to firmly and rigidly engage the inside circumferential surface on the spring collet. As illustrated, behind each screw position the collet is provided with a tapered hole 21, and each screw has a tapered nose 22 for engagement with the radially inner edge of the tapered hole 21, so that when the screw is turned up the effect of the tapered hole and tapered nose on the screw will be to urge the pads radially outwardly into firm engagement with the spring collet jaws and longitudinally forwardly relatively to the collet jaws, so as to cause tight engagement between the surfaces 18 and 19 as well as the surface 17 with the inner circumferential surface of the collet.

The collet, as is usual, is provided with a keyway 23 between two of the jaws, and a key 24 is carried by the spindle nose and fits into the keyway 23, for preventing relative rotation between the spindle and the collet.

It will be noted that, with a collet of the drawback type as herein illustrated, when the stock has been fed forwardly and is so held by the feed tube 10 and the spring collet is then drawn rearwardly to cause the pads 14—15—16 to grip the stock, there will be considerable thrust between the stock held in the feed tube 10 and the pads, tending to move the latter forwardly relatively to the spring collet jaws. Any such forward movement of the pads relatively to the spring collet jaws is solidly resisted by the relatively abutting surfaces 18—19, and such surfaces, as will be noted, are very sturdy integral surfaces, formed directly on the pads and collet jaws. There is substantially nothing to wear or work loose, the screws simply holding such surfaces in tight engagement with each other and not themselves taking the thrusts mentioned.

It will be seen that the pads may be very easily removed simply by backing off the screws 20 a sufficient distance to cause the noses to clear the collet jaws, after which the pads may be moved radially inwardly a sufficient distance to permit disengagement of the surfaces 18—19 and endwise withdrawal of the pads. In applying new pads the steps of removal are followed in reverse order. In conventional collets the pads are held on by screws extending radially inwardly through the jaws and into the pads. Such screws are secured by the spindle nose and it is necessary to remove the collet to gain access to the screws when pads are to be applied or removed. The location of the screws 20 at the front of the collet where they are accessible without removal of the collet is a great advantage and convenience. The pads are relatively simple and cheap to manufacture and various sizes of pads may be kept in stock and quickly applied to the same collet as occasion for gripping of different stock sizes may demand.

While the invention has been described in considerable detail and a preferred form shown, it is to be understood that various changes may be made within the scope of the invention as defined in the appended claims.

I claim:

1. A spring collet, pads for said collet, said pads and collet having mutually abutting surfaces for limiting longitudinal movement of said pads in one direction on said collet and outward radial movement of said pads in said collet, taper nosed screw means carried by said pads, said collet having a tapered surface for engagement by said taper-nosed means, whereby upon the engagement of said taper-nosed means with said tapered surface said pads will be urged radially outwardly in said collet and longitudinally thereon in one direction.

2. In a collet, a plurality of collet jaws having longitudinally tapered outer surfaces to fit a tapered seat means, pads for said jaws, each jaw having an abutment surface facing toward the end of said jaw having the smaller diameter of said tapered surface, each pad having an abutment surface facing toward the end of said jaw having the larger diameter of said tapered surface, said abutment surfaces being in mutually abutting relationship to solidly resist end movement of said pads on said jaws in the direction toward the end of said jaws having the larger diameter of said tapered outer surfaces, said jaws and pads having mutually abutting surfaces to resist radial outward movement of said pads on said jaws, and means at the front of said jaws and pads and coacting with said jaws and pads for holding the latter on said jaws with the mutually abutting surfaces aforesaid in mutually abutting relationship.

3. A collet including a plurality of jaws, separate pads for said jaws, each jaw and each pad having mutually abutting generally radially extending surfaces for limiting relative movement in one axial direction, and mutually abutting generally longitudinally extending surfaces for limiting relative outward radial movement of said pads on said jaws, and means accessible for actuation at the front of said collet and bodily carried by each pad and applicable and detachable as a unit with the pad when the latter is applied to and detached from its jaw, said means being engageable with a part of the jaw for holding said surfaces in mutually abutting relationship as aforesaid.

4. In a device of the character indicated, a draw-back type collet including a plurality of jaws tapering at the outside from the front toward the rear, the larger diameter being at the front, each jaw having a rearwardly facing abutment shoulder, pads for said jaws, each pad having a forwardly facing abutment shoulder for coaction with the shoulders on said jaws to solidly resist forward movement of said pads on said jaws, said jaws and pads having coacting surfaces to resist outward radial movement of said pads on said jaws, and a screw in threaded engagement with a bore through a part of each said pad at the front end thereof and engageable at the rear end with a part of its said jaw to force said pads forwardly relatively to said jaws and said abutment shoulders into solid engagement with each other.

5. In a device of the character indicated, a draw-back type collet including a plurality of jaws tapering at the outside from the front toward the rear, the larger diameter being at the front, each jaw having a rearwardly facing abutment shoulder, pads for said jaws, each pad having a forwardly facing abutment shoulder for coaction with the shoulders on said jaws to solidly resist forward movement of said pads on said jaws, said jaws and pads having coacting surfaces to resist outward radial movement of said pads on said jaws, and means acting between said pads on said jaws, and means acting between said pads and jaws for forcing said pads forwardly on said jaws and said shoulders into solid engagement with each other.

6. A pad for application to and detachment from a jaw of a chuck, said pad having a generally radially extending surface to abut a part of the jaw and having a generally longitudinally extending surface to abut a part of the jaw, said pad having a generally longitudinally extending threaded bore extending inwardly from the front end thereof, and a screw threaded into said bore, said screw being accessible for actuation in said bore from the front of said pad.

DONALD H. MONTGOMERY.